(12) United States Patent
Stouffs et al.

(10) Patent No.: US 8,697,167 B2
(45) Date of Patent: Apr. 15, 2014

(54) PROCESS FOR PREPARING SOLIDIFIED MALTITOL AND ITS USE IN FOOD AND PHARMA PRODUCTS

(75) Inventors: Robert Henri-Marcel Stouffs, Ferrara (IT); Adriano Rossi, S. Maria Maddalena (IT); Simonetta Zerbinati, Rovigo (IT); Johan Augusta Maria Antoon Peremans, Ekeren (BE); Michel Henri Andre Gonze, Brussels (BE)

(73) Assignee: Cargill, Incorporated, Wayzata, MN (US)

( * ) Notice: Subject to any disclaimer, the term of this patent is extended or adjusted under 35 U.S.C. 154(b) by 1042 days.

(21) Appl. No.: 10/576,748

(22) PCT Filed: Oct. 20, 2004

(86) PCT No.: PCT/IB2004/003644
§ 371 (c)(1),
(2), (4) Date: Feb. 15, 2007

(87) PCT Pub. No.: WO2005/037849
PCT Pub. Date: Apr. 28, 2005

(65) Prior Publication Data
US 2007/0122535 A1 May 31, 2007

(30) Foreign Application Priority Data
Oct. 21, 2003 (EP) .................................. 03256636

(51) Int. Cl.
*A23L 1/236* (2006.01)

(52) U.S. Cl.
USPC ........................... 426/548; 426/453; 426/454

(58) Field of Classification Search
USPC .............................. 426/548, 453, 454; 127/60
See application file for complete search history.

(56) References Cited

U.S. PATENT DOCUMENTS

| | | | |
|---|---|---|---|
| 4,789,559 A | 12/1988 | Hirao et al. | |
| 4,831,129 A * | 5/1989 | Serpelloni | 536/124 |
| 5,583,215 A * | 12/1996 | Kawashima et al. | 536/127 |
| 5,651,829 A | 7/1997 | Caboche | |
| 6,120,612 A | 9/2000 | Mitsuhashi et al. | |
| 6,458,401 B1 * | 10/2002 | Beauregard et al. | 426/548 |
| 2003/0190387 A1 | 10/2003 | Zuehlke et al. | |

FOREIGN PATENT DOCUMENTS

| | | |
|---|---|---|
| EP | 0664960 | 8/1995 |
| EP | 1 207 164 | 5/2002 |
| EP | 1 576 890 | 9/2005 |
| EP | 1 371 292 | 2/2007 |
| JP | 1-165346 | 6/1989 |
| JP | 2000-270810 | 10/2000 |
| JP | 2002-17266 | 1/2002 |
| WO | WO 99/59426 | * 11/1999 |
| WO | WO 02/076227 | 10/2002 |

OTHER PUBLICATIONS

Ichikawa and Mitsumura, "Effects of the Addition of New Saccharide Sweeteners on the Properties of Sponge Cakes," *J. Home Econ. Jpn.*, 1996, 47(5):445-452.

Kuragano and Wada, "Effect of functional Saccharide Sweeteners on the Expansion and Textural Properties of Baked Products with Low Moisture Content," *Journal of Cookery Science of Japan*, 2002, 35(3):258-265.

Fukumoto et al., "Developing cakes that can be eaten without worry by diabetic patients," *Practice: Journal of Practical Diabetes*, 2001, 18(3):335-337.

PCT International Search Report PCT/EP2011/004421. Mailed Oct. 6, 2011. 2 pgs.

Abstract of EP Patent No. EP 1207164 A; May 22, 2002. 1 page.

* cited by examiner

*Primary Examiner* — Elizabeth Gwartney

(57) ABSTRACT

The present invention relates to a process for preparing solidified maltitol. The solidified maltitol is prepared by turbulating a maltitol powder with gas and contacting it with a maltitol containing syrup wherein the quantity of the powder is ≥the quantity of the syrup. The solidified maltitol has superior properties in bakery products. It is further suitable in other food products such as confectionery, chewing gum coatings and tablets.

16 Claims, No Drawings

PROCESS FOR PREPARING SOLIDIFIED MALTITOL AND ITS USE IN FOOD AND PHARMA PRODUCTS

CROSS-REFERENCE TO RELATED APPLICATIONS

This application is a National Stage application under 35 U.S.C. §371 and claims benefit under 35 U.S.C. §119(a) of International Application No. PCT/IB2004/003644 having an International Filing Date of Oct. 20, 2004, which claims the benefit of priority of EP 03256636.6 having a filing date of Oct. 21, 2003.

TECHNICAL FIELD

The present invention relates to a process for preparing solidified maltitol and its use in feed, food, pharma and cosmetic products.

BACKGROUND

Maltitol or α-D-glucopyranosyl-4-D-sorbitol is a polyol obtainable by hydrogenation of maltose.

It is known to prepare anhydrous crystalline maltitol by inducing the crystallization of said maltitol in a syrup sufficiently rich in this product and sufficiently purified.

U.S. Pat. No. 4,408,041 relates to a crystallization process wherein maltitol solution can be used to grow anhydrous crystals of maltitol by the addition of seed crystals at a supersaturated concentration.

U.S. Pat. No. 6,120,612 covers a continuous manufacturing method for anhydrous crystalline maltitol. The process starts with a maltitol rich syrup, which is heated in a concentrating step, followed by a seed crystal adding and mixing step accompanied by more heating, to give a massecuite; and a crystal aging step where the massecuite is subjected to disintegration, mixing, stirring and transfer in an atmosphere in which temperature and moisture are adjusted to proceed the crystallization.

EP 0 561 585 relates to a method for manufacturing powdery or granular crystalline maltitol, which comprises adding seed crystals of maltitol at a temperature lower than the melting point of the seed crystals of maltitol to an aqueous solution of maltitol with 1-15% by weight of moisture content; and a shearing force is applied continuously.

U.S. Pat. No. 5,932,015 provides an economical method for manufacturing crystalline maltitol by adding a crystalline mixture solid powder containing crystalline maltitol as seeds.

EP 1 207 164 and its equivalent U.S. Pat. No. 6,458,401 describes the continuous mixing of maltitol syrup and seed crystals by rotation of the receptacle.

EP 1 300 414 describes the crystallization of maltitol by providing shear force to a maltitol aqueous solution in the presence of air bubbles.

EP 0 741 140 and EP 0 816 373 describes a process for manufacturing crystalline maltitol and crystalline mixture solid containing crystalline maltitol.

There is a further need for having a process for preparing solidified maltitol in high yields and without the need of expensive spray-drying.

The current invention provides such a process.

SUMMARY OF INVENTION

The current invention relates to a process for preparing solidified maltitol and said process is comprising the following steps:

a) turbulating a quantity A of powder of maltitol and a quantity B of a maltitol containing syrup, at a temperature from 20° C. to a second temperature wherein the second temperature is selected such that the maltitol powder remains solid and wherein quantity A is ≥quantity B, for obtaining granulated product, b) drying of granulated product, c) reducing particle size of dried granulated product for obtaining solidified maltitol.

The current invention further relates to a process further comprising a recycle of all or a part of the solidified maltitol from step c) into step a) as the maltitol powder.

The current invention relates to a process wherein in step a) the powder of maltitol is turbulated with a gas. Said gas is nitrogen gas or air, preferably air.

The current invention relates to a process wherein in step b) drying of granulated product is carried out with a gas having a temperature from 20° C. and a second temperature wherein the second temperature is selected such that the maltitol powder remains solid.

Furthermore, the current invention relates to a process taking place in a fluid bed.

The current invention is further characterized in that the maltitol syrup is comprising a dry matter content of from 40% to 80% and maltitol content equal or greater than 70% based on dry matter, preferably a maltitol content higher than 80% based on dry matter, more preferably a maltitol content higher than 90% based on dry matter.

The current invention further relates to a process wherein the temperature in step a) is from 50° C. to a second temperature wherein the second temperature is selected such that the maltitol powder remains solid, preferably from 70° C. to said second temperature more preferably from 80° C. to said second temperature.

Furthermore, the current invention relates to a process wherein the content of maltitol of solidified maltitol of step c) is from 90% w/w to 99.5% w/w based on dry substance, preferably from 92% w/w to 97% w/w based on dry substance, more preferably from 94% w/w to 96% w/w based on dry substance.

More in detail, the current invention relates to a process comprising the following steps:

a) loading powder of maltitol into fluid bed basket, b) having gas inlet temperature, preferably air inlet temperature of from 80° C. to a second temperature wherein the second temperature is selected such that the maltitol powder remains solid, preferably from 90° C. to 95° C., c) adding into the feeding basket of fluid bed a maltitol syrup with dry matter content of 70%, d) spraying through nozzle said maltitol syrup onto powder of maltitol for obtaining granulated product, e) drying said granulated product for obtaining a dried granulated product with a moisture content below 1%, preferably below 0.5%, f) milling of said dried granulated product for obtaining solidified maltitol, g) recycling a part or all of said solidified maltitol into step a) until obtaining in step f) a solidified maltitol with a maltitol content from 95% to 98%, preferably from 95% to 97%, more preferably from 95.5% to 96.5%.

Furthermore, the current invention relates to the use of solidified maltitol obtainable according to the aforementioned process in feed, food, pharma or cosmetic products. The food products are selected from the group consisting of bakery products, confectionery, tablets, chewing gum, and coated edible cores.

The current invention further relates to a bakery product comprising flour, fat, sweetening agent, and characterized in that sweetening agent is comprising from 25% to 100% solidified maltitol obtainable according to the aforementioned process.

Furthermore, the current invention relates to tablets comprising from 2% to 100% solidified maltitol obtainable according to the aforementioned process.

DETAILED INVENTION

The current invention relates to a process for preparing solidified maltitol and said process is comprising the following steps:
 a) turbulating a quantity A of powder of maltitol and a quantity B of a maltitol containing syrup, at a temperature from 20° C. to a second temperature wherein the second temperature is selected such that the maltitol powder remains solid and wherein quantity A is ≥quantity B, for obtaining granulated product,
 b) drying of granulated product,
 c) reducing particle size of dried granulated product for obtaining solidified maltitol.

At the start-up of the process, ie. the very first addition of powder, the maltitol powder in step a) is crystalline maltitol. The content of maltitol in crystalline maltitol is from 99.7% w/w to 100% w/w.

An essential feature of the current process is the fact that the quantity of the powder is ≥quantity of the syrup. In the current process the powder particles are granulated, agglomerated and/or coated with the dry substance of the maltitol syrup. Preferably the amount of the dry substance of the syrup is about 15 to 35% based on dry substance of powder.

The powder of maltitol is turbulated in a stream of gas wherein this gas is nitrogen gas and/or air, preferably air. The temperature of the turbulating gas is very important and it is from 20° C. to a second temperature wherein the second temperature is selected such that the maltitol powder remains solid. Crystalline maltitol has a specific melting temperature, about 150° C., but as soon as the purity of the maltitol powder is decreasing, the melting temperature is decreasing as well and/or is not just a specific melting point but rather a melting range. The temperature of the turbulating gas has to be selected such the maltitol powder remains solid and is not converted into a liquid syrup. In a specific embodiment, the temperature is below 150° C., preferably below 140° C., more preferably below 130° C., most preferably below 100° C. In another specific embodiment the temperature is from 80° C. to 95° C., preferably from 90° C. to 95° C.

The turbulation with gas makes sure that there is a good contacting surface of all the particles of maltitol powder with the maltitol syrup. What happens is that the powder particles are getting into contact with the syrup and the dry substance of the syrup is coated, agglomerated and/or granulated onto the powder particles.

The droplet of liquid falling on a powder particle instantaneously solidifies and liberates water which is transported by the gas. The gas not only disperses the powder particles for coating, granulating and/or agglomerating but the granulated product is dried simultaneously.

The current invention further relates to a process further comprising a recycle of all or a part of the solidified maltitol from step c) into step a) as the maltitol powder.

The current invention relates to a process further comprising at least once a recycle of said solidified maltitol into step a), preferably at least twice, more preferably at least five times, most preferably seven to eight times.

As soon as solidified maltitol is obtained in step c) this product can be used as the starting product of the process. Depending upon the final purity (is content of maltitol based on dry substance) of the solidified maltitol one can decide to start the process with crystalline maltitol or solidified maltitol prepared in a previous process. Preferably the process is started with solidified maltitol and there is no further need of having crystalline maltitol.

The recycle involves all or a portion of the solidified maltitol. It can be a complete recycle of the solidified maltitol into step a) in order to arrive at the effective purity (is content of maltitol based on dry substance) of the solidified maltitol or it can be a partial recycle such that this quantity is still bigger then the quantity of the incoming maltitol syrup.

The subsequent drying step makes sure that the dried granulated product has a moisture content below 1%, preferably below 0.5%.

The reduction of the particle size in step c) increases the specific surface area of the particles and increases the contacting surface of the particles. This improves the contact with the incoming maltitol syrup while being turbulated.

In a specific embodiment, the current invention further relates to a process which is taking place in a fluid bed.

Preferably, the current invention relates to a batch process wherein the final product is obtained after drying of the granulated product in step b). No further saturation and/or crystallization is required and the subsequent step c) just increases the specific surface area.

The current invention is further characterized in that the maltitol syrup is comprising a dry matter content of from 40% to 80% and maltitol content equal or greater than 70% based on dry matter.

Preferably the maltitol content is higher than 80% based on dry matter, more preferably a maltitol content higher than 90% based on dry matter. The dry matter is preferably about 70%.

The current invention further relates to a process wherein the temperature in step a) is from 50° C. to a second temperature wherein the second temperature is selected such that the maltitol powder remains solid, preferably from 70° C. to said more preferably from 80° C. to said second temperature. Preferably the process is taking place at a temperature above 20° C. In a typical example the temperature is at least 90° C., more preferably below 100° C.

Furthermore, the current invention relates to a process wherein the content of maltitol of solidified maltitol of step c) is from 90% w/w to 99.5% w/w based on dry substance, preferably from 92% w/w to 97% w/w based on dry substance, more preferably from 94% w/w to 96% w/w based on dry substance.

A specific embodiment of the current invention relates to a process which is comprising the following steps:
 a) loading powder of maltitol into fluid bed basket,
 b) having gas inlet temperature, preferably air inlet temperature of from 80° C. to a second temperature wherein the second temperature is selected such that the maltitol powder remains solid, preferably from 90° C. to 95° C.,
 c) adding into the feeding basket of fluid bed, a maltitol syrup with dry matter content of 70%,
 d) spraying through nozzle said maltitol syrup onto powder of maltitol for obtaining granulated product,
 e) drying said granulated product for obtaining a dried granulated product with a moisture content below 1%, preferably below 0.5%,
 f) milling of said dried granulated product for obtaining solidified maltitol, g) recycling a part or all of said solidified maltitol into step a) until obtaining in step f) a solidified maltitol with a maltitol content from 95% to 98%, preferably from 95% to 97%, more preferably from 95.5% to 96.5%.

Preferably the maltitol syrup is sprayed through a multi-head nozzle.

The drying of the product is requiring about 15 to 40 minutes and depends upon the amount of maltitol containing syrup.

The milling can be performed in any type of mill.

The current invention can provide a solidified maltitol with a moisture content below 0.5% and a maltitol content (based on dry substance) between 95% to 98% and the remainder being from 0.5-2% w/w sorbitol, from 0.5-3% w/w DP3 and from 0.2 to 0.5% w/w DP4. In a more specific example the maltitol content (based on dry substance) of the solidified maltitol, prepared according to the process of the current invention, is from 95.5 to 96.5% and the remainder of the dry substance is made up of sorbitol, DP3 and DP4. The moisture content is preferably from 0.2 to 0.3%.

Furthermore, the current invention relates to the use of said solidified maltitol in feed, food, pharma or cosmetic products.

Said food products are selected from the group consisting of bakery products, confectionery, tablets chewing gum, and coated edible cores, wherein the solidified maltitol is mainly applied for the coating.

The current invention further relates to a bakery product which is comprising flour, fat, sweetening agent, and characterized in that sweetening agent is comprising from 25% to 100% (based on dry substance) of said solidified maltitol. When the sweetening agent is containing less than 100% maltitol (based on dry substance) the remainder of the sweetening agent is selected from the group of sucrose, glucose, fructose, fructose syrups, invert sugar, polyols, intense sweeteners and mixtures thereof. An intense sweetener, which can be used as non-nutritive sweetener can be selected from the group consisting of aspartame, acesulfame salts such as acesulfame-K, saccharins (e.g. sodium and calcium salts), cyclamates (e.g. sodium and calcium salts), sucralose, alitame, neotame, steviosides, glycyrrhizin, neohesperidin dihydrochalcone, monatin, monellin, thaumatin, brazzein and mixtures thereof.

Biscuits prepared with solidified maltitol have properties which are comparable to biscuits prepared with sucrose. Actually the solidified maltitol gives superior properties when compared to the use of crystalline maltitol in bakery products.

Furthermore, the current invention relates to tablets comprising from 2% to 100% of said solidified maltitol, preferably comprising from 2% to 99% of said solidified maltitol. Tablets are obtainable by compressing the solidified maltitol into a type of cylinder. In a specific embodiment the tablets have a diameter bigger than 1 cm and/or have a weight of about 350 mg. Tabletting with solidified maltitol and magnesium stearate results in hard tablets. These tablets can be used as type of confectionery or they can contain active ingredients and can be applied as pharma products. Tablets prepared with solidified maltitol of current invention and 0.5% magnesium stearate reach maximum hardness between 35 and 45 KN Main pressure.

The current invention has the following advantages:

a low cost-effective process for preparing solidified maltitol.

solidified maltitol has an universal use in feed, food, pharma or cosmetic products.

the solidified maltitol of current invention is particular useful in chewing gum and coatings, specifically hard coatings of edible cores.

bakery products containing solidified maltitol have properties which are comparable and/or superior to bakery products prepared with sucrose or crystalline maltitol.

tablets containing solidified maltitol have an acceptable hardness.

The current invention is illustrated by way of the following examples.

Example 1

3 kg of crystalline maltitol (C☆Maltidex CH 16385—Cerestar product) were loaded in the fluid bed extractable basket (5 kg capacity).

The inlet air temperature was set to 88° C.

0.9 kg d.s. of C☆Maltidex H 163K9 (Cerestar product—maltitol syrup at 70% d.s.) was introduced in the feeding basket. The liquid syrup was sprayed on the powder through a hydropneumatic multi-head nozzle.

The granulated product was dried for 30 minutes to reach a moisture content <0.5%.

Product was milled with a Retsch SK 100 mill.

3 kg of said product is then recycled in the fluid bed as powder to be further granulated with C☆Maltidex H 163K9.

Coating (Granulation)/drying/milling were repeated until the maltitol content in the granulated powder had decreased with ca. 3.0% to a maltitol content (based on dry substance) of 96.3%.

The maltitol content of the final powder is measured with HPLC.

Example 2

Use of Solidified Maltitol in Bakery Products
Recipe:

|  | Trial Number | |
| --- | --- | --- |
|  | 1 | 2 |
| Margarine | 370 | 370 |
| Sucrose | 318 | 0 |
| Solidified Maltitol prepared in example 1 | 0 | 318 |
| Whole milk solids | 10 | 10 |
| Salt | 14 | 14 |
| Water | 140 | 140 |
| C☆Gel 20006[1] | 102 | 102 |
| Flour (Uno) | 972 | 972 |
| Baking powder | 15 | 15 |

[1]C☆Gel 20006 = wheat starch

Procedure:

All ingredients except flour, water and baking powder were creamed during 5 minutes at medium speed in Hobart N50 mixer.

Water was added and mixed during 1 minute. The flour was added and mixing proceeded 2.5 minutes at medium speed.

1 kg dough was laminated in 6 steps until 3.5 mm.

The dough pieces were cut with round plug.

The dough was baked during 10 minutes at 190° C.

The biscuits were baked on a perforated plate.

Evaluation of Dough Preparation:

After Cream Preparation the Following Items were Measured:

|  | Trial Numbers | |
|---|---|---|
|  | 1 | 2 |
| Temperature of cream (° C.) | 24.8 | 24.8 |
| Spec. volume (cm³/g) | 1.44 | 1.47 |
| Stevens viscosity (Load.gram) speed 50 mm/min, penetration 25 mm with cone | 163 | 141 |

The viscosity of the dough was determined, immediately after preparing the dough, by Stevens Texture Analyser, using the cone and measuring at penetration depth of 25 mm.

| Final dough | | |
|---|---|---|
|  | Trial Numbers | |
|  | 1 | 2 |
| Dough temperature ° C. | 26.3 | 26.3 |
| Stevens viscosity (Load.gram) speed 50 mm/min, penetration 25 mm with cone | 295 | 334 |
| Weight of 10 pieces dough | 75.4 | 74.3 |

¹ C☆Gel 20006 = wheat starch

The use of solidified maltitol results in a dough preparation and a baked product which has similar properties as the products prepared with sucrose.

Evaluation of Baked Products:

|  | Trial Numbers | |
|---|---|---|
|  | 1 | 2 |
| Height in mm, calculated to 100 gram of biscuits | 93.9 | 93.4 |
| Spec. volume (g/cm³) | 1.41 | 1.52 |
| Indication hardness, breaking 10 biscuits into two parts by cone Stevens Texture Analyzer: Force in grams | 1241 | 1255 |
| Diameter baked product expressed in mm | 47.5 | 47.5 |
| Moisture in % | 2.4 | 2.2 |

Structure of Bottom:
Biscuits prepared with solidified maltitol or sucrose are comparable: i.e. regular and open.

Example 3

Use of Solidified Maltitol in Tablets

The solidified maltitol from example 1 was applied for preparing tablets on the Fette tablettizer, (Type Perfecta 1000) 0.5% magnesium stearate based on dry substance of maltitol dry substance was added. The product was mixed for 3 minutes in a low shear rotating tubular mixer (Twist PBI 10975) and applied on the Fette tablettizer. 22 punches were used. The material was compressed at a speed of 20.000 tablets/h. The tablets had a diameter of 1.1 cm and a weight of 350 mg.

The properties of the prepared tablets were evaluated by measuring their tensile strength (measured with a Fette Checkmaster 3) as a function of the compression force.

Tensile Strength represents the tension where the material breaks. It can be measured as hardness in Newton, in function of compression force in KNewton main pressure. Maximum hardness is reached between 35 and 45 KN Main pressure.

The invention claimed is:

1. A process for preparing solidified non-crystalline maltitol, wherein said process comprises the following steps:
a) turbulating and simultaneously drying a quantity A of maltitol powder and a quantity B of a maltitol-containing syrup in a stream of gas in a fluid bed at a temperature between about 20° C. and a second temperature at which the maltitol powder is still solid, wherein the quantity A is greater than or equal to the quantity B so as to obtain a coated, granulated maltitol product, wherein the gas is nitrogen and/or air and the temperature of the gas is from 80° C. to 95° C.,
b) reducing the particle size of the coated, granulated maltitol product to produce solidified non-crystalline maltitol, wherein the content of maltitol in the solidified non-crystalline maltitol is from about 92% w/w to about 97% w/w based on dry substance, and
c) recycling all or a portion of said solidified non-crystalline maltitol into step a) as powder of maltitol,
wherein said process does not include any further saturation or crystallization step.

2. The process of claim 1, wherein the maltitol-containing syrup comprises a dry substance content of from about 40% to about 80% and a maltitol content of equal to or greater than about 70% based on dry substance.

3. The process of claim 1, wherein the temperature in step a) is between about 50° C. and said second temperature.

4. The process of claim 1, wherein the temperature in step a) is between about 70° C. and said second temperature.

5. The process of claim 1, wherein the temperature in step a) is between about 80° C. and said second temperature.

6. The process of claim 1, wherein the content of maltitol in the solidified maltitol of step b) is from about 94% w/w to about 96% w/w based on dry substance.

7. Solidified maltitol made by the process of claim 1.

8. A process for preparing solidified non-crystalline maltitol, wherein said process comprises the following steps:
a) loading maltitol powder into a fluid bed basket;
b) providing a stream of gas having an inlet temperature between about 80° C. and the melting temperature of the maltitol powder;
c) adding a maltitol syrup into a feeding basket of the fluid bed, wherein said maltitol syrup has a dry substance content of about 70%;
d) spraying said maltitol syrup onto the maltitol powder using said stream of gas to obtain a coated, granulated non-crystalline maltitol product and simultaneously drying said coated, granulated non-crystalline maltitol product;
e) milling said coated, granulated non-crystalline maltitol product to obtain solidified non-crystalline maltitol; and
f) recycling a part or all of said solidified non-crystalline maltitol into step a), wherein step f) is repeated until the solidified non-crystalline maltitol obtained in step e) has a maltitol content of from about 92% (w/w) to about 97% (w/w),
wherein said process does not include any further saturation or crystallization step.

9. The process of claim 8, wherein said gas is air.

10. The process of claim 8, wherein said gas inlet temperature is between about 90° C. and about 95° C.

11. The process of claim 8, wherein said granulated maltitol product has a moisture content of less than about 0.5%.

12. The process of claim 8, wherein step f) is repeated until the solidified maltitol obtained in step e) has a maltitol content of from about 95.5% to about 96.5%.

13. A feed, food, pharma or cosmetic product comprising the solidified maltitol of claim 7.

14. The product of claim 13, wherein said food product is selected from the group consisting of a bakery product, a tablet, a confectionery, chewing gum, and a coated edible core.

15. The tablet of claim 14, wherein said tablet comprises between about 2% and about 100% of the solidified maltitol of claim 7.

16. A bakery product comprising flour, fat, and a sweetening agent, wherein the sweetening agent comprises from about 25% to about 100% of the solidified maltitol of claim 7.

* * * * *